United States Patent [19]
Getty

[11] 4,332,570
[45] Jun. 1, 1982

[54] ANATOMICAL MODEL

[76] Inventor: Paul A. Getty, 2113 Glenwood Ave., Saginaw, Mich. 48601

[21] Appl. No.: 721,456

[22] Filed: Sep. 8, 1976

[51] Int. Cl.³ .............................................. G09B 23/32
[52] U.S. Cl. ................................................... 434/274
[58] Field of Search ............................. 35/17; 434/274

[56] References Cited

U.S. PATENT DOCUMENTS 2,435,614  2/1948  Tureman, Jr. .
3,188,753  6/1965  Lovercheck ........................ 434/274

Primary Examiner—Harland S. Skogquist
Attorney, Agent, or Firm—Rogers, Eilers & Howell

[57] ABSTRACT

A simulated finger model having articulated simulated finger bones with cords representing the major tendons to produce flexion and extension of the finger bones in the manner of the natural hand, with interconnections between an extensor tendon and intrinsic tendons to produce the proper interrelationship therebetween; with connections between the extensor tendon and the middle phalanx with a hood interconnecting the extensor tendon and the intrinsic tendons adjacent the metacarpophalangeal joint; with a resilient component interconnecting the simulated bones of the metacarpophalangeal joint tending to restore it to extended position; and with a further elastic component interconnecting the first and middle phalanges representing the capsule and collateral ligaments of the proximal interphalangeal joint. Other components control the various manipulative parts of the model to cause it to simulate the human finger in its operations and also components are provided to enable the model to demonstrate the results of malfunctions of various of these components such as may be caused by injury or disease.

29 Claims, 13 Drawing Figures

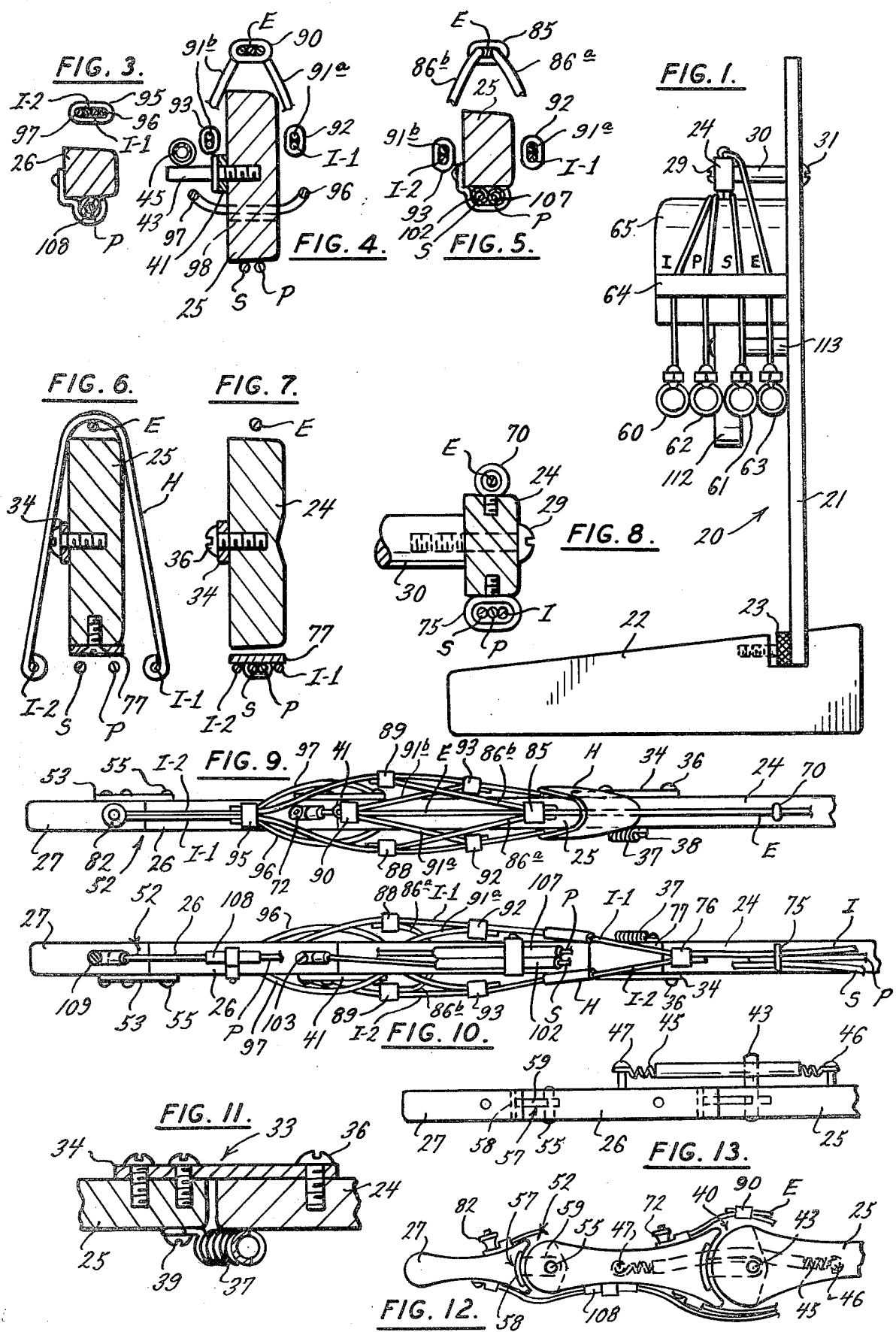

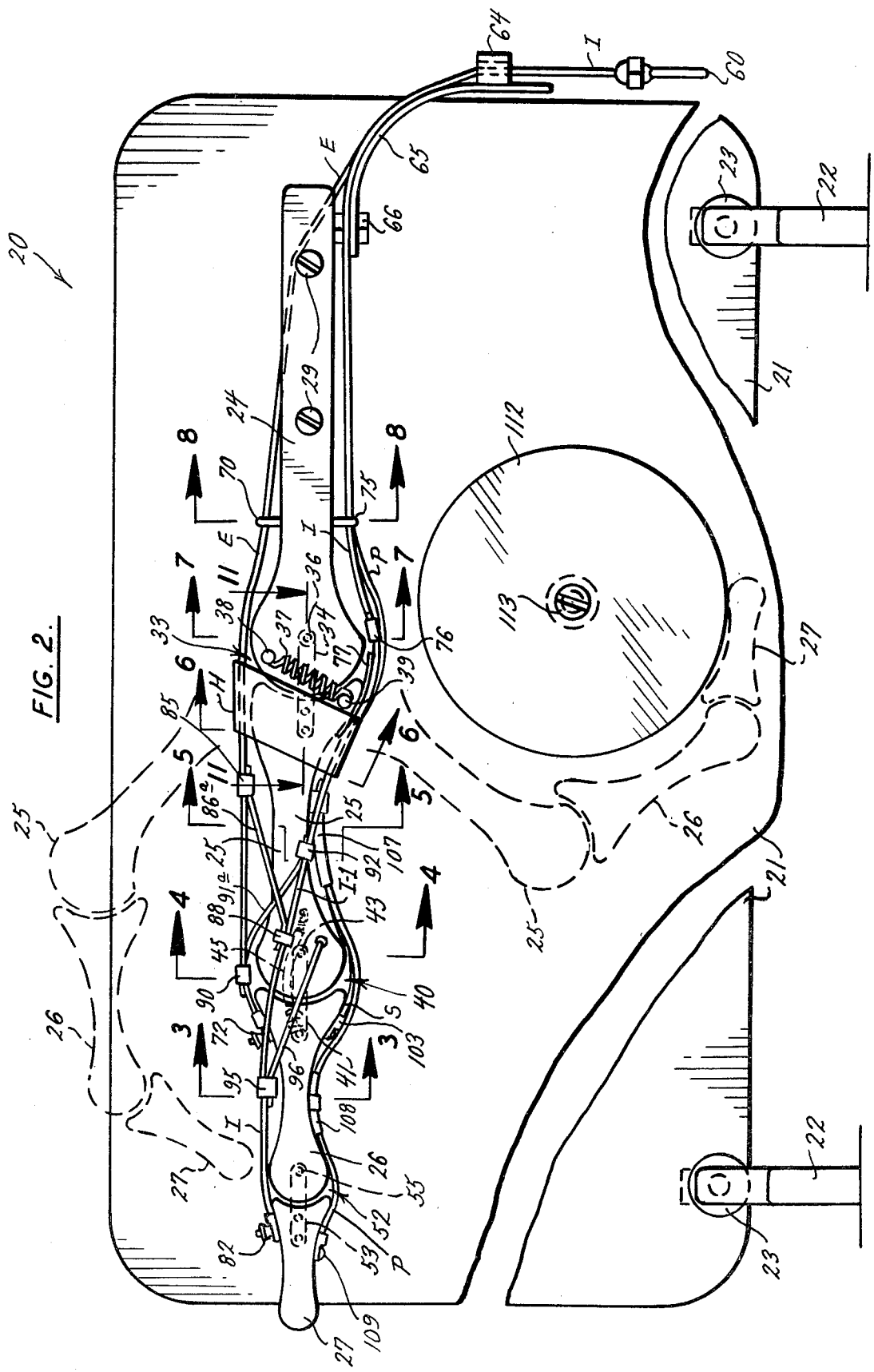

ANATOMICAL MODEL

BACKGROUND OF THE INVENTION

Other finger models have been made to be manipulated for demonstration purposes but none, to the knowledge of the applicant, has had the interconnections of the various tendons that the present model possesses. The principal deficiency of prior art models has been the limitation to single or joint functions with at best only partial inter-tendonal or inter-joint capabilities. This is true also where artificial hand models have been provided.

The primary advantage of the present model relates to the interconnections of the simulated tendon cords. For example, the extensor and intrinsic cords are interconnected in two different respects so that the distal interphalangeal and proximal interphalangeal joints may be extended only by tensing the extensor cord along with the intrinsic cord. The finger model was built primarily to demonstrate this unique feature.

Another feature of the present invention is that there is an elastic means tending to urge the metacarpophalangeal joint into extended position but permitting that joint to overextend to a certain extent in such wise that a greater movement of the joint can be obtained when it is extended. Also a feature is the presence of an elastic means at the proximal interphalangeal joint that tends to apply a restorative extensor force to that joint tending to return it from a flexed position.

Another feature is that some of the tendon cords are connected by removable connections so that they may be readily disconnected to demonstrate abnormalities caused by injury or disease.

Other objects include the provision of simulated sublimis and profundus tendon cords, especially in combination with the foregoing tendon cords. The sublimis tendon cord is designed to operate most particularly the proximal interphalangeal joint between the middle and first phalanges, with tunnels or tendon sheaths simulating those features of the human hand. The profundus tendon cord is particularly adapted to control the distal interphalangeal joint between the distal and middle phalanges and likewise has appropriate tunnel or tendon sheaths that cause it to simulate the action of the profundus tendon of the human hand.

All of these major cords, namely, the simulated intrinsic or I cord, simulated sublimis of S cord, the simulated profundus or P cord, and the simulated extensor or E cord, are all brought to a location with respect to the model that enables them to be operated by the fingers of the demonstrator to show normal and abnormal functions of the finger.

The fuller description to follow will show other advantages of this model.

DESCRIPTION OF THE DRAWINGS

FIG. 1 is an end elevation of the model;

FIG. 2 is a front elevation, some parts being broken away and with some positions shown in dashed lines;

FIG. 3 is a partial section on line 3—3 of FIG. 2;

FIG. 4 is a vertical section on the line 4—4 of FIG. 2;

FIG. 5 is a vertical section approximately on the line 5—5 of FIG. 2;

FIG. 6 is a vertical section approximately on the line 6—6 of FIG. 2;

FIG. 7 is a vertical section approximately on the line 7—7 of FIG. 2;

FIG. 8 is a vertical section approximately on the line 8—8 of FIG. 2;

FIG. 9 is a top view of the model with the right-hand portion broken off;

FIG. 10 is a bottom view of the model with the right-hand portion broken off, and with some parts broken away;

FIG. 11 is a horizontal section of the proximal metacarpal joint taken on the line 11—11 of FIG. 2;

FIG. 12 is an elevation of the proximal interphalangeal joint showing a resilient means for regulating the same, showing an alternate hinge arrangement from that as shown in previous Figures; and FIG. 13 is a top view of that joint, showing the modified hinge arrangement, not showing the cords.

DESCRIPTION OF THE PREFERRED EMBODIMENT

The finger model generally indicated at 20 comprises a base having a vertical rigid support board 21 removably secured to feet 22 as by interfitting the board 21 into notches in feet 22 and frictionally holding the board 21 in the notches by screws 23. This disposes the board 21 in a vertical position which is convenient for the present demonstration.

The model includes simulations of the bones of one finger of a human hand, the same being a metacarpal 24, a first or proximal phalanx 25, a middle phalanx 26, and a distal phalanx 27. They may be made of wood, plastic, metal or other appropriate rigid material, mounted and connected as will be described.

The metacarpal 24 is mounted on the board 21 and spaced forward thereof. Screws 29 through the metacarpal 24 engage in spacers 30 that in turn are attached to the upper parts of the board 21 by screws 31. This rigidly holds the metacarpal 24 to the board in spaced relationship forwardly thereof.

The simulated metacarpal 24 is convexly rounded at its outer end to form a part of a metacarpophalangeal joint 33. This convexly rounded outer end receives the concavely rounded end of the simulated proximal phalanx 25. These two are hinged together by a hinge plate 34 which is rigidly attached to the center of the concave end of the proximal phalanx 25 as by screws. The hinge plate 34 extends and is attached to metacarpal 24 as by a pivot pin 36. Alternately, other forms of hinges may be used, such as that hinge hereinafter described, and shown in FIGS. 12 and 13. An elastic flexible member here shown as a spring 37 is connected to the metacarpal 24 at 38 and to the proximal phalanx 25 at 39 as by pins. This spring is normally relaxed when the joint is extended but is tensed when the joint is flexed.

The proximal phalanx 25 is in turn convexly curved at its outer end for representation of the proximal interphalangeal joint 40. This convex curvature interfits with the concave curvature on the middle phalanx 26. In the embodiment shown in FIG. 2, the first and middle phalanges are hinged together by a hinge plate 41 (FIGS. 2 and 4) that is rigidly attached to the concave end of the middle phalanx 26 and is connected to phalanx 25 as by a pivot pin 43.

In FIG. 13 the hinge pin 43, is shown extending rearwardly a substantial distance from the proximal phalanx. An elastic member, here illustrated as a spring 45, is attached at one end by a screw 46 to the proximal or first phalanx 25, passes over the extension of the pin 43, and is attached at its other end by a screw 47 to the middle phalanx 26. A piece of plastic tubing can be provided to encase the spring 45, if desired. FIG. 13 shows that this spring 45 is somewhat deformed in passing from the pin 46 to the pin 47 over the hinge pin 43. This spring 45 is extended when the proximal interphalangeal joint 40 is flexed from its extended position and represents the capsule and collateral ligament of the proximal interphalangeal joint 40. (The spring 45 arrangement is not shown in FIGS. 9 and 10 for purposes of clarity).

The middle phalanx 26 is also convexly rounded at its outer end to aid in simulating the distal interphalangeal joint 52. The distal phalanx 27 is concavely curved in the same connection. A hinge plate 53 is rigidly attached to the concave end of the distal phalanx 27, and is attached to the convex end of middle phalanx 26 by pivot pin 55.

In FIGS. 12 and 13 a modified form of hinge is shown, that may be used in place of any of the hinges in the model. This hinge arrangement is shown for the distal interphalangeal joint 52 in FIGS. 12 and 13 and in the proximal interphalangeal joint 40 in FIG. 13. As the arrangement is the same at both joints, a description of the distal interphalangeal joint 52 arrangement is sufficient to describe both. The arrangement at the distal interphalangeal joint 52 comprises a rigid hinge plate 57 having a curved base 58 and a hinge tongue plate 59 rigidly attached to it and projecting from it. The curved base is attached by screws or cement to the correspondingly curved recession in the edge of the distal phalanx 27. The tongue 59 fits between bifurcated end pieces of the adjacent middle phalanx, where it receives and pivots on the hinge pin 55.

With the metacarpal 24 rigidly secured to the board 21 and spaced forwardly from it, the phalanges can individually pivot, one on the other, in the manner of human finger bones, from extended positions such as in solid lines in FIG. 1, to other positions such as shown in dashed lines. Means will now be described that represent the several tendons and related parts of the human hand that provide the movements of these finger bones.

The model has four principal cords representing tendons. They are the intrinsic I, the profundus P, the sublimis S, and the extensor E. In the model, these cords terminate at the right side of the model, hanging down in a cluster. Each of these cords has a ring or loop attached to its end to receive the fingers of the operator so that they may be tensed in the manner that muscles tense them. Cord I has a ring 60, cord P a ring 62, cord S a ring 61 and cord E a ring 63.

Considering first the extensor tendon cord E, it extends from its ring 63 upwardly through a retaining loop 64, and over an arcuate guide 65 that is attached at 66 to the under side of the metacarpal 24 and may be attached to the board 21 so as to be rigid. The tendon cord E extends upwardly from the top side of the arcuate guide 65 and over the right-hand spacer 30 and through an eyelet 70 secured to the top of the metacarpal 24. Thus it extends over the joint 33 and is firmly connected as by cement or like adhesive to the top portion of hood H at a point above the concave end of the first phalanx (FIG. 6). Hood H has an inverted "U" shape and represents the dorsal expansion or hood of the human finger. Hood H can be flexible or semi-rigid and can be made of plastic, cloth, canvas or like material. From hood H, the tendon E then extends forward over the joint 40 and is attached to the top edge of the middle phalanx 26 by a readily releasable knurled nut fastening 72. The various retaining means keep the extensor cord E over the top edges of the model finger bones. Pulling down on the loop 63 thus can pull the proximal and distal interphalangeal joints 40 and 52 into extended positions.

The intrinsic tendon cord I, representing both the lumbrical muscle and tendon, and interosseous muscle and tendon, extends upwardly from its ring 60, over the arcuate guide 65, and thence below the metacarpal and through an eyelet 75 secured to the bottom edge of the metacarpal 24 (FIG. 8). From the eyelet 75 the cord I extends through a clip 76 from which point it divides into two strands I-1 and I-2.

Tracing the branch I-1, it extends below a guide or volar plate 77 attached to the bottom edge of the phalanx 25 and extending beneath the joint 33. Beyond the volar plate 77, the cord I, is firmly secured in the front lower turned-up looped edge of hood H. Guide plate 77 simulates the volar plate of the human hand.

From the hood the cord I-1 extends upwardly and outwardly across the face of the model and ultimately is attached to the distal phalanx 27 by a knurled nut fastening 82, that permits it to be attached and detached quickly. From the connection 82 about which the cord is looped, it returns inward as I-2 downwardly and backwardly on the back side of the model to be secured firmly in the rear edge loop of the hood H, and finally is secured by the clip 76 together with the branch I-1. The hood H, being connected to the E cord and both branches of the I cord, acts to maintain those cords within a fixed distance relative to each other.

The tendon cords E and I are connected together by other means also that further simulate the connections between them in the human finger. Above and a little outwardly from the joint 33 a clip 85 above the top edge of the first phalanx 25 has dual cords 86a and 86b which extend downwardly and outwardly and at their other ends are connected by clips 88 and 89 to the branches I-1 and I-2, respectively. These connecting cords 86a and 86b permit the effect of cord I at its connection at 82 to the distal phalanx 27 to properly simulate the combined effect of the interosseous muscle and tendon, the lumbrical muscle and tendon, and the extensor muscle and tendon of the human hand upon the distal interphalangeal joint 52.

Also from the position further out on the extensor cord E at a clip 90, dual branches of a cord, 91a and 91b, extend inwardly and downwardly and are connected respectively to the cords I-1 and I-2 by clips 92 and 93. Connecting cords 91a and 91b permit the effect of cord E at its connection at 72 to the middle phalanx 26 to simulate the combined effect of the interosseous muscle and tendon, and the lumbrical muscle and tendon, and the extensor muscle and tendon of the human hand upon the proximal interphalangeal joint 40.

In addition to the foregoing, the cords I-1 and I-2 are connected to the first phalanx. Above the middle of the middle phalanx there is a clip 95 that holds the ends of a cord forming two branches 96 and 97. This cord passes through a hole 98 below and a little to the inward side of the pivot 43 of the round end of the first phalanx. This simulates the Landsmeer's ligament of the human hand which, by limiting the flexion of the distal interphalangeal joint 52, coordinates the flexing of the distal and proximal interphalangeal joints.

The S cords leads from the ring or loop 61 over the guide 65 and represents the sublimis tendon. It is partly broken away in FIG. 10. From the guide plate 65 the S cord passes through the loop 75, thence under the volar plate 77 and through a tunnel or sheath 102, which can be made of rubber or plastic tubing, or the like that is secured to the under side of the proximal phalanx 25 as by a hook attachment (see FIG. 5). The sheath 102 and other sheathes yet to be described simulate tendon sheathes or tunnels of the human hand. Sheath 102 confines cord S closely to the underside of the proximal phalanx. From the sheath 102 the S cord then extends below the joint 40 and is attached at 103 as by a screw fastening to the under edge of the middle phalanx 26 near the joint 40. It can be seen from this that pulling on the ring 61 can flex the proximal interphalangeal joint 40, and to some extent, flex the metacarpophalangeal joint 33. As previously noted, flexion of the proximal interphalangeal joint 40 stretches the spring 45 and flexing of the metacarpophalangeal joint 33 extends the spring 37.

The P cord, representing the profundus tendon, passes from its connection to ring 62, through loop 64, over the guide 65, beneath the metacarpal 24, and through the eyelet 75. Cord P is also partly broken away in FIG. 10. Thence cord P passes below volar plate 77 and through a tunnel 107. Tunnel 107 corresponds to the tunnel 102 and is likewise secured to the bottom edge of the first phalanx 25 as by a hook. Thence cord P extends under the joint 40 and through a tunnel 108 secured to the under edge of the middle phalanx 26 at its middle as by a hook. And finally from tunnel 108 extends under the joint 52 and is attached to the distal phalanx as by a screw connection 109.

The various cords that extend over or under the edges of the several bone simulations, remain confined by those edges during the flexion and extension of those bones. Further, the E cord always remains above the pivot 43, even during maximum flexion, so that it can always exert an extending force on the joint 40, rather than to convert to a flexion force. In any case, the directions of tension of the cords must be equivalent to those produced by having the cords retained on the edges as aforesaid.

A rounded disc 112 is mounted at 113 to the board 21 to represent an object to be grasped by the finger model.

OPERATION OF THE MODEL

The model 20 is designed to demonstrate both normal and abnormal operations of a finger. Broadly speaking, a flexing or grasping action of the finger can be obtained by pulling the control strings I, S and P, while relaxing the control cord E. Thus assuming the finger model to be in a straight and extended position, the little finger, the middle finger and the index finger of the demonstrator's left hand may be inserted respectively in the rings 60, 62 and 61 of the cords I, P and S and these rings all drawn. In this action, pulling on the ring 60 and cord I will, through connection with the hood and the outer end of the model, flex the joint 33 while extending the proximal interphalangeal joint 40 and the distal interphalangeal joint 52.

Pulling on the ring 61 and the S cord will flex the proximal interphalangeal joint 40 and to a lesser degree will aid in flexing the metacarpophalangeal joint 33. This latter action occurs because of the passage of the cord S through the tunnel or tendon sheath 102, and under the guide 77.

Pulling on the cord ring 62 and the cord P will flex the distal interphalangeal joint 52 and the proximal interphalangeal joint 40 and, to a lesser degree, the metacarpophalangeal joint 33. The latter two flexions occur because of the arrangements of the tunnels 107 and 108. The flexing of the distal interphalangeal joint 52 is limited by the cord 96–97, which defines the maximum distance from the hole 98 to the member 27.

When the extensor cord E is pulled by action on the ring 63 as by the index finger of the right hand of the demonstrator, the metacarpophalangeal joint 33 is extended and to a lesser extent the proximal interphalangeal joint 40 and distal interphalangeal joint 52 are extended. This last occurs by virtue of the connections 86a and 86b between the extensor cord E and the intrinsic cord I. However, the complete extension of the finger cannot be obtained without drawing on the intrinsic cord I, because intrinsic cord I stabilizes the metacarpophalangeal joint 33 preventing hyperextension to occur at this joint 33 and thus allowing more extension to occur in the proximal and distal interphalangeal joints 40 and 52. Because of its connections through the interconnecting cords 91a and 91b to the E cord, pulling on cord I also acts to extend joint 40. Thus the cords E and I can cooperate to extend all the joints. The complete extension is obtained by drawing on both cords E and I.

The independent action of anyone of the tendons can be obtained by pulling on the appropriate one of the control cords without the others.

Pulling on the cords E and I together can extend the proximal interphalangeal joint 40 even from the grasping position as the cord E wraps over the convex end of the first phalanx plus the action of the intrinsics. The connecting cords from the intrinsics, 91a and 91b, in the grasping position are outside or above the pivot center 43 so that when they are pulled, they aid in returning joint 40 to its extended position.

The return of both the joints 33 and 40 is aided by the elastic members. The joint 33 is urged to return from a flexed position by action of the spring 37, while the joint 40 is urged to return from a flexed position by the action of the spring 45. These two elastic members aid the demonstration in connection with the actions of the cords E and I and their interconnections. The two springs are substantially relaxed when the bone members are in straight extended positions. Cord sections 96 and 97, which simulate the Landsmeer ligament, act through their connection to cord I at clip 95 to restrict the flexion of joint 52, as they restrict the separation of the junction 82 from the hole 98.

The model 20 also illustrates some of the abnormal positions of the finger bones. The severance of the sublimis tendon S or other like sublimis minus deformity is demonstrated from the straight model finger position by pulling on the cords except for the S cord.

The model also demonstrates the inability of the extensor tendon E to extend the finger from a fixed position without the assistance of the intrinsic tendons I as might occur in median or Ulnar paralysis. This illustrates one advantage of the cross connections between the E and I cords.

The abnormal condition occurring when the profundus tendon is severed can be demonstrated from the straight finger position by pulling on the cords I and S without pulling on P and E.

A hammer or baseball finger deformity can be demonstrated from the straight position by removing the knurled nut from the connection at 82, thus permitting the I cord to be disconnected from the distal phalanx 27. After this disconnection of the I cord, the hammer finger deformity can be shown from the straight finger position by pulling on the I and P cords. The middle and proximal phalanx are then located in alignment with metacarpal 24, and the distal phalanx is dropped downward at an angle of approximately 90 degrees with the middle phalanx 26. After such demonstration the I cord can be reattached to the distal phalanx 27 by replacing the knurled nut at connection 82.

The boutonniere deformity can be illustrated from the straight position by removing the knurled nut at connection 72, and disconnecting the E cord from the middle phalanx 26. After this disconnection the deformity can be shown by pulling on the I cord ring 60 and the E cord 63. In this position the proximal phalanx 25 is angled upward from the metacarpal, and the middle phalanx is angled downward from the proximal phalanx. The distal phalanx 27 is approximately parallel with the metacarpal 24. After this deformity is illustrated the E cord can be reconnected at 72 to the middle phalanx 26.

The claw hand deformity can be illustrated from the straight finger model position by pulling on the E cord ring 63 while holding the P cord ring 62 in position. When this is done, the model will assume approximately the position shown in dashed lines above the straight finger in FIG. 2.

The intrinsic plus deformity also known as the swan neck deformity can be illustrated generally by a stronger pull on the I cord ring 60 than on the E cord ring 63. When this is done, the proximal phalanx 25 is angled downward slightly from the metacarpal 24, while middle phalanx 26 is angled upward from the proximal phalanx approximately 40 degrees to 50 degrees.

Various changes and modifications may be made within this invention as will be readily apparent to those skilled in the art. Such changes and modifications are within the scope and teaching of this invention as defined by the claims appended hereto.

I claim:

1. An anatomical finger model comprising a base and simulated finger bones mounted thereon, including a proximal phalanx for pivoting about a horizontal axis when the model is upright, means pivotally supporting it at its proximal end onto the base, a middle phalanx with means pivotally connecting its proximal end to the distal end of the proximal phalanx; a first cord extending across the upper part of the middle phalanx, so that tension on the cord can pivot the middle phalanx about the proximal phalanx into extended positions; a second cord supported to be disposed at the lower part of the proximal phalanx, and then to extend alongside it toward the upper part thereof, and connections between the two cords having means causing tension on one of the cords to draw on the other cord.

2. The structure of claim 1 wherein the said first cord is connected to the upper portion of said middle phalanx.

3. The structure of claim 1 wherein the connections between the two cords has means causing tension on the second cord to draw on the first cord.

4. The structure of claim 1 wherein the connections between the two cords includes a member connected to the first cord and connected to the second cord, the connection of the said member to the first cord being distal in relation to the connection of the member to the second cord, whereby tension on the second cord causes tension on the first cord.

5. The structure of claim 4 wherein the connections between the two cords has means causing tension on the first cord to draw on the second cord.

6. The structure of claim 5 wherein the means to draw on the second cord includes a member connected to the first cord and connected to the second cord, the connection of the member to the first cord being proximal to the connection of the member to the second cord, whereby tension on the first cord causes tension on the second cord.

7. The structure of claim 6 wherein the connections between the two cords are flexible.

8. The structure of claim 6 including a distal phalanx with means pivotally connecting its proximal end to the distal end of the middle phalanx; and wherein the said second cord extends alongside the upper portion of the middle phalanx and alongside the upper portion of the distal phalanx and has means connecting it to the distal phalanx so that tension on the second cord can pivot the distal phalanx about the middle phalanx into extended positions.

9. The structure of claim 8 including means to limit the flexion of the distal phalanx about its connection to the middle phalanx.

10. The structure of claim 9 wherein the means to limit the flexion of the distal phalanx includes a member connected to a phalanx and connected to the second cord, whereby the member acts in the manner of the Landsmeer ligament to limit flexion of the distal phalanx.

11. The structure of claim 6 including means to resist flexion of the proximal phalanx about its connection to the base.

12. The structure of claim 11 wherein the means to resist includes a resilient member connected to the proximal phalanx and connected in fixed relationship to the base.

13. The structure of claim 6 including means to resist flexion of the middle phalanx in relation to the proximal phalanx.

14. The structure of claim 13 wherein the means to resist includes a resilient member connected to the middle phalanx and connected to the proximal phalanx.

15. The structure of claim 6 including a third cord connected to the distal phalanx and extending alongside the bottom portion of the distal phalanx, the bottom portion of the middle phalanx and the bottom portion of the proximal phalanx so that tension on the said third cord can pivot the distal phalanx about the middle phalanx into flexed positions.

16. The structure of claim 15 wherein the third cord is attached to the underside of the middle phalanx so that tension on the third cord can pivot the middle phalanx about the proximal phalanx into flexed positions.

17. The structure of claim 15 wherein the third cord is attached to the underside of the proximal phalanx so that tension on the third cord can pivot the proximal phalanx about its connection to the base into flexed positions.

18. The structure of claim 6 including a fourth cord attached to the middle phalanx and extending alongside the underside of the middle phalanx and the underside of the proximal phalanx so that tension on the fourth cord can pivot the middle phalanx about the proximal phalanx into flexed positions.

19. The structure of claim 18 wherein the fourth cord is attached to the underside of the proximal phalanx so that tension on the fourth cord can pivot the proximal phalanx about its connection to the base into flexed positions.

20. The structure of claim 6 wherein the means pivotally supporting the proximal phalanx includes a simulated metacarpal attached to the base with means pivotally connecting its distal end to the proximal end of the proximal phalanx.

21. The structure of claim 6 wherein the connections between the two cords include means to control the position of the first cord relative to the second cord near the proximal end of the proximal phalanx including a member connected to the second cord alongside the lower portion of the proximal phalanx near the proximal end of the proximal phalanx and extending upward from that connection towards the first cord, and connected to the first cord alongside the upper portion of the proximal phalanx.

22. The structure of claim 6 including a distal phalanx with means pivotally connecting its proximal end to the distal end of the middle phalanx; and wherein said second cord extends alongside the upper portion of the middle phalanx and alongside the upper portion of the distal phalanx and has means connecting it to the distal phalanx, and thence extends from its connection to the distal phalanx alongside the upper portion of the distal phalanx and alongside the upper portion of the middle phalanx and then extends alongside the proximal phalanx towards the lower part thereof; the connections between the two cords includes means to control the position of the first cord relative to the second cord near the proximal end of the proximal phalanx including a member having one end connected to the second cord alongside the lower portion of the proximal phalanx near the proximal end of the proximal phalanx, the member extending upward from that connection on one side of the proximal phalanx towards the first cord, and connected to the first cord alongside the upper portion of the proximal phalanx and extending downward from that connection on the opposite side of the proximal phalanx towards the second cord and having its other end connected to the second cord alongside the lower portion of the proximal phalanx near the proximal end of the proximal phalanx.

23. The structure of claim 1 wherein the connections between the two cords has means causing tension on the first cord to draw on the second cord.

24. The structure of claim 1 wherein the connections between the two cords includes a member connected to the first cord and connected to the second cord, the connection of the member to the first cord being proximal in relation to the connection of the member to the second cord, whereby tension on the first cord causes tension on the second cord.

25. The structure of claim 24 wherein the connecting member is flexible.

26. An anatomical finger model comprising a base and simulated finger bones mounted thereon, including a proximal phalanx for pivoting about a horizontal axis when the model is upright, means pivotally supporting it at its proximal end onto the base, a middle phalanx with means pivotally connecting its proximal end to the distal end of the proximal phalanx, a distal phalanx with means pivotally connecting its proximal end to the distal end of the middle phalanx; a first cord connected to the distal phalanx and extending alongside the bottom portion of the distal phalanx, the bottom portion of the middle phalanx and the bottom portion of the proximal phalanx, so that tension on the cord can pivot the distal phalanx about the middle phalanx into flexed positions; a second cord attached to the middle phalanx and extending alongside the underside of the middle phalanx and the underside of the proximal phalanx so that tension on the second cord can pivot the middle phalanx about the proximal phalanx into flexed positions.

27. The structure of claim 26 wherein the first cord is slidingly attached to the underside of the middle phalanx so that tension on the first cord can pivot the middle phalanx about the proximal phalanx into flexed positions.

28. The structure of claim 26 wherein the first cord is slightly attached to the underside of the proximal phalanx so that tension on the first cord can pivot the proximal phalanx about its connection to the base into flexed positions.

29. The structure of claim 26 wherein the second cord is slidingly attached to the underside of the proximal phalanx so that tension on the cord can pivot the proximal phalanx about its connection to the base into flexed positions.

* * * * *